United States Patent
Ekkelenkamp et al.

(10) Patent No.: US 10,369,493 B2
(45) Date of Patent: Aug. 6, 2019

(54) PROCESS FOR INITIATING AN AMMONIUM SULFATE CRYSTALLIZATION PROCESS

(71) Applicant: CAP III B.V., Urmond (NL)

(72) Inventors: Geert Ekkelenkamp, Urmond (NL); Johan Thomas Tinge, Urmond (NL); Pieter Vonk, Urmond (NL)

(73) Assignee: CAP III B.V., Urmond (NL)

( * ) Notice: Subject to any disclaimer, the term of this patent is extended or adjusted under 35 U.S.C. 154(b) by 635 days.

(21) Appl. No.: 14/424,639

(22) PCT Filed: Aug. 28, 2013

(86) PCT No.: PCT/EP2013/067788
§ 371 (c)(1),
(2) Date: Feb. 27, 2015

(87) PCT Pub. No.: WO2014/040858
PCT Pub. Date: Mar. 20, 2014

(65) Prior Publication Data
US 2015/0224421 A1    Aug. 13, 2015

(30) Foreign Application Priority Data
Sep. 11, 2012   (EP) .................................... 12183915

(51) Int. Cl.
*B01D 9/00*    (2006.01)
*C01C 1/248*    (2006.01)
(Continued)

(52) U.S. Cl.
CPC .......... *B01D 9/0018* (2013.01); *B01D 9/0031* (2013.01); *B01D 9/0036* (2013.01);
(Continued)

(58) Field of Classification Search
CPC .. B01D 9/0018; B01D 9/0031; B01D 9/0036; C01C 1/24; C01C 1/248
See application file for complete search history.

(56) References Cited

U.S. PATENT DOCUMENTS

| | | | |
|---|---|---|---|
| 3,530,924 A | | 9/1970 | Domning |
| 3,628,919 A | * | 12/1971 | Beauchamp ......... B01D 9/0022 23/301 |

(Continued)

FOREIGN PATENT DOCUMENTS

| | | |
|---|---|---|
| CN | 101708870 | 5/2010 |
| CN | 101928016 | 12/2010 |

(Continued)

OTHER PUBLICATIONS

International Search Report, PCT/EP2013/067788 (3 pages) dated Jan. 2, 2014.

(Continued)

*Primary Examiner* — Matthew D Krcha
(74) *Attorney, Agent, or Firm* — Nixon & Vandernye P.C.

(57) ABSTRACT

A continuous process for producing crystalline ammonium sulfate, said process comprising a start-up operation followed by a steady-state operation, wherein the start-up operation comprises: i) in a crystallizer, evaporating solvent from an approximately saturated ammonium sulfate solution; ii) replacing evaporated solvent with further approximately saturated ammonium sulfate solution; iii) introducing to the crystallizer seed crystals of ammonium sulfate; iv) continuing to evaporate solvent, until a desired degree of supersaturation is reached; and v) recovering crystalline ammonium sulfate from ammonium sulfate solution in a recovery unit, and the steady-state operation comprises: vi) continuously feeding approximately saturated ammonium sulfate solution into the crystallizer and continuously withdrawing ammonium sulfate crystals from the (Continued)

Figure 1:
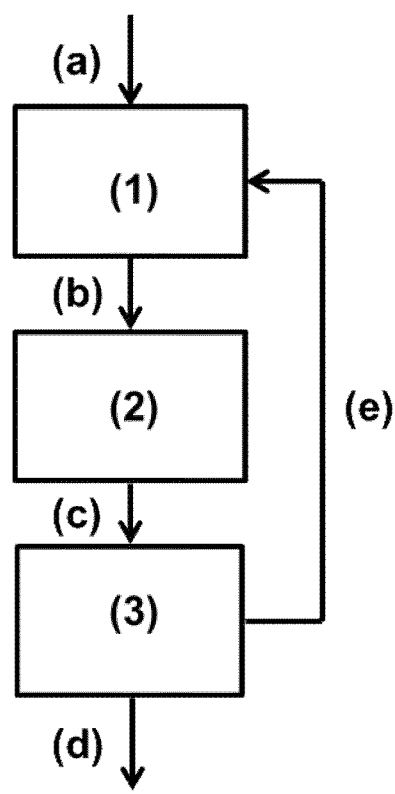

crystallizer, such that the total combined volume of ammonium sulfate solution and ammonium sulfate crystals within the crystallizer remains constant; and vii) recovering crystalline ammonium sulfate from ammonium sulfate solution in a recovery unit, characterized in that the degree of supersaturation in the crystallizer during the start-up operation is maintained between 1.2% and the point at which primary nucleation occurs; and apparatus suitable for carrying out the process.

13 Claims, 3 Drawing Sheets

(51) Int. Cl.
    *C05C 3/00*     (2006.01)
    *C01C 1/24*     (2006.01)

(52) U.S. Cl.
    CPC ............... *C01C 1/24* (2013.01); *C01C 1/248* (2013.01); *C05C 3/00* (2013.01); *B01D 2009/0086* (2013.01); *C01P 2004/60* (2013.01)

(56) References Cited

U.S. PATENT DOCUMENTS

| | | | | |
|---|---|---|---|---|
| 4,159,194 A | * | 6/1979 | Steward | B01D 9/0013 23/301 |
| 5,330,544 A | * | 7/1994 | Thomson | C01C 1/248 159/4.04 |
| 5,872,259 A | * | 2/1999 | Reuter | B01D 9/0009 548/267.8 |
| 2003/0180202 A1 | | 9/2003 | Ellen et al. | |
| 2011/0038781 A1 † | | 2/2011 | Hofmann | |
| 2011/0061205 A1 † | | 3/2011 | Scholz | |

FOREIGN PATENT DOCUMENTS

| | | | | |
|---|---|---|---|---|
| CN | 101 531 382 | | 7/2011 | |
| CN | 101531382 | | 7/2011 | |
| GB | 768040 A | * | 2/1957 | ........... B01D 9/0004 |
| JP | 3-208814 | | 9/1991 | |
| JP | 7-64553 | | 12/1995 | |
| WO | 00/56416 | | 9/2000 | |
| WO | 2009/077346 | | 6/2009 | |
| WO | WO 2009/077346 | | 6/2009 | |

OTHER PUBLICATIONS

Seager, S. L. et al, *Chemistry for today: General, organic, and biochemistry*, Chapter 7, pp. 202-204 (2008).
Syamal, A., *Living Science Chemistry, A Book of Science and Technology 9*, p. 39 (2009).

\* cited by examiner
† cited by third party

PROCESS FOR INITIATING AN AMMONIUM SULFATE CRYSTALLIZATION PROCESS

This application is the U.S. national phase of International Application No. PCT/EP2013/067788, filed 28 Aug. 2013, which designated the U.S. and claims priority to EP Application No. 12183915.3, filed 11 Sep. 2012, the entire contents of each of which are hereby incorporated by reference.

The invention relates to a process for preparing crystalline ammonium sulfate.

Ammonium sulfate is useful as a fertilizer, for example in agriculture, horticulture or forestry. It is often applied as a crystalline material. The size of crystals is important, and determines the utility and value. Accordingly, there is often a desired size of ammonium sulfate crystal. A common method of preparing, in a continuous process, crystalline ammonium sulfate is from a saturated or supersaturated solution. Typically, a continuous process comprises a steady-state operation. However, to reach the steady-state operation from a non-operating crystallizer, a start-up operation is required. Similarly, to stop a crystallizer, a shut-down operation is required.

An example of a continuous process for producing crystalline ammonium sulfate is described by A. Mersmann in Crystallization Technology Handbook (1995) 336-340, Marcel Dekker Inc., New York, ISBN 0-8247-9233-5. In the start-up operation described, the crystallizer is fed with an approximately saturated ammonium sulfate solution. The solution is heated to evaporate solvent and initiate crystallization. Evaporation continues such that the crystals grow in size. When a sufficient amount of the crystals are of the desired size, the steady-state operation is initiated: a suspension of ammonium sulfate crystals is continuously withdrawn for separation of solid and liquid; and fresh ammonium sulfate solution is continuously introduced into the crystallizer.

However, a problem with the above process is that ammonium sulfate precipitates onto internal surfaces of the crystallizer causing fouling. This leads to loss of production capacity and causes the crystallizer to be shut-down to be cleaned. Shut-down may be necessitated as often as once or twice a week if operating at high temperatures. The loss in production capacity due to shut-down is magnified because the known start-up processes are time-consuming. During the start-up phase the rate of formation of crystals of the desired size is relatively low. Thus, the overall start-up losses in production capacity are relatively high.

Takiyama and Matsuoka describe in Powder Technology 121 (2001) 99-105, design of seed crystal specifications for start-up operations in continuous mixed-suspension mixed-product removal crystallizers can reduce the time needed for the start-up operation. They describe laboratory scale experiments (720 ml vessel), with addition of seed crystals of target size (mass-based average, number-based average or actual product crystals) in a single addition operation. Cooling crystallization is used, as opposed to evaporative crystallization used in a plant. The experiments were performed with an initial slurry density of 27.8 kg/m$^3$; whereas in a chemical plant much higher crystal densities are required to operate economically. Further, the bench scale reactions are carried out at room temperature. Chemical plants typically operate at much higher temperatures, certainly if evaporative crystallization is employed. All of the above differences lead to complications when trying to scale-up the described process.

As a result of the above-mentioned start-up procedure, the time to reach steady-state is significantly reduced. However, there remain problems in scaling-up such a process to production scale. When a reactor of, say, 100 m$^3$ is used, scale-up of the process would require approximately 30 tonnes of seed crystals. It is uneconomical to provide these on such a large scale, due to the extra equipment needed, for example storage and mixing equipment. Further, the seed crystals used (and consumed in the seeding process) are crystals of product specification.

It is an object of the present invention to provide a continuous process for preparing crystalline ammonium sulfate, which overcomes one or more drawbacks of the above-mentioned processes. In particular, it is an object to provide a start-up operation, which is quicker than known processes. Another object is to provide a crystallization process with a higher production capacity. Further, it is desired to increase throughput of the process, and reduce energy consumption. In addition, an object is to reduce the proportion of ammonium sulfate crystals produced which are below the desired size. One or more further objectives that may be addressed will become apparent from the description below.

The present inventors have found an improved start-up process for an ammonium sulfate plant. The process can be implemented economically, and still provide a quicker time to steady-state operation than known production scale crystallization processes. In particular, they have discovered that careful control of supersaturation in the crystallizer can allow use of a much lower amount of seed crystals, and that seed crystals smaller than those of product specification may be used.

Accordingly, the present invention provides a continuous process for producing crystalline ammonium sulfate, said process comprising a start-up operation followed by a steady-state operation, wherein the start-up operation comprises:
 i) in a crystallizer, evaporating solvent from an approximately saturated ammonium sulfate solution;
 ii) replacing evaporated solvent with further approximately saturated ammonium sulfate solution;
 iii) introducing to the crystallizer seed crystals of ammonium sulfate;
 iv) continuing to evaporate solvent, until a desired degree of supersaturation is reached; and
 v) recovering crystalline ammonium sulfate from ammonium sulfate solution in a recovery unit, and
 the steady-state operation comprises:
 vi) continuously feeding approximately saturated ammonium sulfate solution into the crystallizer and continuously withdrawing ammonium sulfate crystals from the crystallizer, such that the total combined volume of ammonium sulfate solution and ammonium sulfate crystals within the crystallizer remains constant; and
 vii) recovering crystalline ammonium sulfate from ammonium sulfate solution in a recovery unit,
 characterized in that the degree of supersaturation in the crystallizer during the start-up operation is maintained between 1.2% and the point at which primary nucleation occurs.

By crystalline ammonium sulfate is meant the end-product of the claimed process. To avoid confusion this term does not include seed crystals or crystals in the crystallizer, or crystals removed from the crystallizer, but crystals recovered in the separating unit.

Any suitable crystallizer may be used. It is preferred to use a crystallizer of the DTB-type or Oslo-type. Since production of large crystals is preferred, a low-shear crystallizer is preferred.

A separating unit is used during the steady-state operation. The separating unit typically removes crystals below the desired size. Separation may be by any suitable method, but is typically by sieve or hydrocyclone.

The approximately saturated solution of ammonium sulfate is typically not saturated. The degree of saturation is preferably 95% to 100%. More preferably, it is 98% to 99.9%. Yet more preferably it is 99% to 99.8%. This avoids the risk of unwanted spontaneous crystallization. Approximately saturated solution of ammonium sulfate is preferably added to the crystallizer such that a constant total combined volume of ammonium sulfate solution and ammonium sulfate crystals is maintained in the crystallizer. This maximizes productivity of the crystallizer. A typical tolerance of constant total combined volume of ammonium sulfate solution and ammonium sulfate crystals within the crystallizer is 5 vol. %, but preferably it is 3 vol. %, more preferably 2 vol. %.

Saturation is known by the person skilled in the art. To avoid confusion, saturation is defined as: [concentration of dissolved ammonium sulfate]/[concentration of dissolved ammonium sulfate at saturation]. It is therefore unit-less; and is typically expressed as a percentage.

Evaporation may be at atmospheric pressure, or higher or lower. The skilled person would select the most appropriate pressure based on the economics of equipment and energy.

Typically crystallization is by evaporative crystallization. Typically, therefore it occurs at elevated temperature. Preferably, the temperature in the crystallizer is above 40° C. More preferably, the temperature in the crystallizer is from 45° C. to 150° C.; yet more preferably it is from 50° C. to 130° C.

Supersaturation may be measured by techniques known to the skilled person. Supersaturation may be determined in-line or by taking a sample and measuring off-line. Typically, measurement is made in-line. Preferably, refractive index or Fourier transform infra-red spectroscopy (FTIR) are used. These techniques are described by Kadam et al. in Crystal Growth & Design (2010), Vol. 10, 2629-2640. The point of primary nucleation is determined by measuring the nucleation behaviour of ammonium sulfate using the probability distribution of induction times, as described by Jiang and ter Horst in Crystal Growth & Design (2011), Vol. 11, 256-261.

Typically, the supersaturation in the crystallizer during the start-up operation is maintained above 1.2%, preferably, above 1.3%, more preferably, above 1.4%, for example above 1.5%. Typically, the supersaturation in the crystallizer during the start-up operation is maintained below 2.5%; preferably, below 2.4%; more preferably, below 2.3%; yet more preferably, below 2.2%. Typically, the supersaturation in the crystallizer during the start-up operation is maintained between 1.2% and 2.5%. Preferably, the supersaturation in the crystallizer during the start-up operation is maintained between 1.3% and 2.2%.

Supersaturation is known by the person skilled in the art. To avoid confusion, superaturation is defined as: [concentration of dissolved ammonium sulfate]/[concentration of dissolved ammonium sulfate at saturation]−1. It is therefore unit-less; and is typically expressed as a percentage.

Crystal growth increases with increasing supersaturation. Accordingly, higher supersaturation is preferred. However, supersaturation should be kept below the primary nucleation point, in order to prevent spontaneous, rapid uncontrolled crystallization. Such uncontrolled crystallization produces a large number of small crystals. The resulting drop in supersaturation means that growth of such crystals is slow. By keeping the supersaturation within the defined limits, crystal growth is maximized, such that larger crystals are produced quickly. Therefore, the steady-state operation is reached more quickly.

Seed crystals of ammonium sulfate are typically introduced in a solution of ammonium sulfate, for example an aqueous solution of ammonium sulfate. Together this takes the form of a slurry or suspension.

The average size of seed crystals is typically below the average size of crystalline ammonium sulfate produced. This avoids that crystals of the desired size are reprocessed. Accordingly, throughput of the process is increased, and energy consumption decreased. In addition, the proportion of ammonium sulfate crystals produced which are below the desired size is reduced.

Typically, the average size of seed crystals fed to the crystallizer is below 1.4 mm. Preferably, the average size of seed crystals is less than 1.3 mm; more preferably less than 1.2 mm. More preferably, the average size of seed crystals is from 0.8 to 1.2 mm.

Crystal growth rate also depends on surface area of crystals present. It is therefore preferable that the surface area of the seed crystal is within a determined range. Typically, the seed crystals of ammonium sulfate have an average crystal surface area of from 1 to 6 $m^2kg^{-1}$. Preferably, it is from 2 to 5 $m^2kg^{-1}$; more preferably from 3 to 4 $m^2kg^{-1}$. Most preferably, the seed crystals of ammonium sulfate have an average crystal surface area of about 3.9 $m^2kg^{-1}$.

Seed crystals of ammonium sulfate are typically introduced over a prolonged period. This is typically up to 10 hours. Preferably, in step iii) the seed crystals of ammonium sulfate are fed for a time period of up to 6 hours. More preferably, they are fed for a time period of from 1 to 4 hours, for example from 2 to 3 hours.

The seed crystals may come from any source. However, typically, they are produced using the crystallizer in an earlier operation and are retained for use as seed crystals. Typically, the seed crystals are fed as part of a slurry. Typically, said slurry has a solid content of from 10 to 40 wt %. More preferably, the solid content is from 20 to 35 wt %; most preferably from 25 to 30 wt %.

The steady-state operation is characterized by maintaining, for example: approximately constant slurry density; approximately constant average crystal size; approximately constant feed rate of ammonium sulfate solution; and approximately constant evaporation rate. The skilled person in the field of crystallization is aware how to recognize steady-state conditions.

Slurry density may be measured by any technique known to the skilled person. This includes pressure difference measurement and radioactive measurement. Preferably, pressure difference measurement is used. Typically, the slurry density of the ammonium sulfate solution at the start of step iii) is from 1230 to 1270 $kgm^{-3}$. Preferably, it is from 1240 to 1260 $kgm^{-3}$; more preferably, from 1245 to 1255 $kgm^{-3}$; for example 1250 $kgm^{-3}$.

As used herein, average crystal size means $D_{50}$, also known as mass-median-diameter. This is known to the skilled person. It may be measured by standard techniques, for example by sieving.

Typically, the average size of crystals leaving the crystallizer is at least 1.4 mm. Preferably, it is at least 1.6 mm.

Typically, the process further comprises a crystal size classification step, wherein a fine crystal fraction and a coarse crystal fraction are produced.

Typically, the coarse crystal fraction comprises crystals of the desired size. The fine crystal fraction may be processed further to yield a less-desirable crystalline ammonium sulfate product. Where a size classification step is present, preferably, at least a portion of the fine crystal fraction is fed from the size classification step to step iii). Typically, in the size classification step, the fine crystal fraction has an average crystal size below 1.4 mm. Typically, the coarse crystal fraction has an average crystal size of at least 1.4 mm.

The present invention further provides apparatus suitable for producing ammonium sulfate crystals by a process as described above, said apparatus comprising:
 a mixing unit;
 a crystallizer;
 a size classifier;
 a recovery unit; and
 a seed crystal preparation unit,
 characterized in that the size classifier is configured to provide crystals to the seed crystal preparation unit and the seed crystal preparation unit is configured to feed a slurry of crystals to the crystallizer during a start-up phase and to the mixing unit during a steady-state operation.

The present invention further provides apparatus suitable for producing ammonium sulfate crystals by a process as described above, said apparatus comprising:
 i) a mixing unit which feeds a crystallizer with a solution of ammonium sulfate;
 ii) which crystallizer produces a suspension of ammonium sulfate crystals and feeds said suspension of ammonium sulfate crystals to a recovery unit;
 iii) which recovery unit separates ammonium sulfate crystals from a solution of ammonium sulfate and feeds said solution of ammonium sulfate to said mixing unit; and
 iv) a seed crystal preparation unit which provides the crystallizer with seed crystals during start-up operation of the process.

Typically, the apparatus further comprises:
 v) a size classifier which is located between the crystallizer and the recovery unit, and which size classifier separates the suspension of ammonium sulfate crystals fed from the crystallizer into a suspension of fine ammonium sulfate crystals and a suspension of coarse ammonium sulfate crystals; and which size classifier feeds the suspension of fine ammonium sulfate crystals to the seed crystal preparation unit; and feeds the suspension of coarse ammonium sulfate crystals to the recovery unit.

Preferably, the seed crystal preparation unit provides seed crystals to the crystallizer during start-up operation of the process; and it provides seed crystals to the mixing unit during steady-state operation of the process.

Typically, the apparatus of the present invention further comprises equipment for providing in-line measurement of supersaturation in the crystallizer.

The apparatus is typically an ammonium sulfate crystallization plant. Preferably, it is a plant capable of producing at least 10,000 tons per year of crystalline ammonium sulfate. Preferably, the apparatus is supplied by feed of ammonium sulfate solution which is a by-product from a caprolactam plant or an acrylonitrile plant.

FIG. 1 depicts a typical set-up according to the prior art. A fresh solution of ammonium sulfate enters, through line (a), a mixing unit (1), where it is mixed with input from line (e) to form a feed solution of ammonium sulfate. The feed solution of ammonium sulfate then passes through line (b) into crystallizer (2), where it is subjected to crystallization, such that a suspension of ammonium sulfate crystals is produced. The suspension of ammonium sulfate crystals passes through line (c) into recovery unit (3), where ammonium sulfate solution is separated from crystalline ammonium sulfate; removed through line (e); and recycled back into mixing unit (1). The crystalline ammonium sulfate is recovered through line (d).

Figure 2:
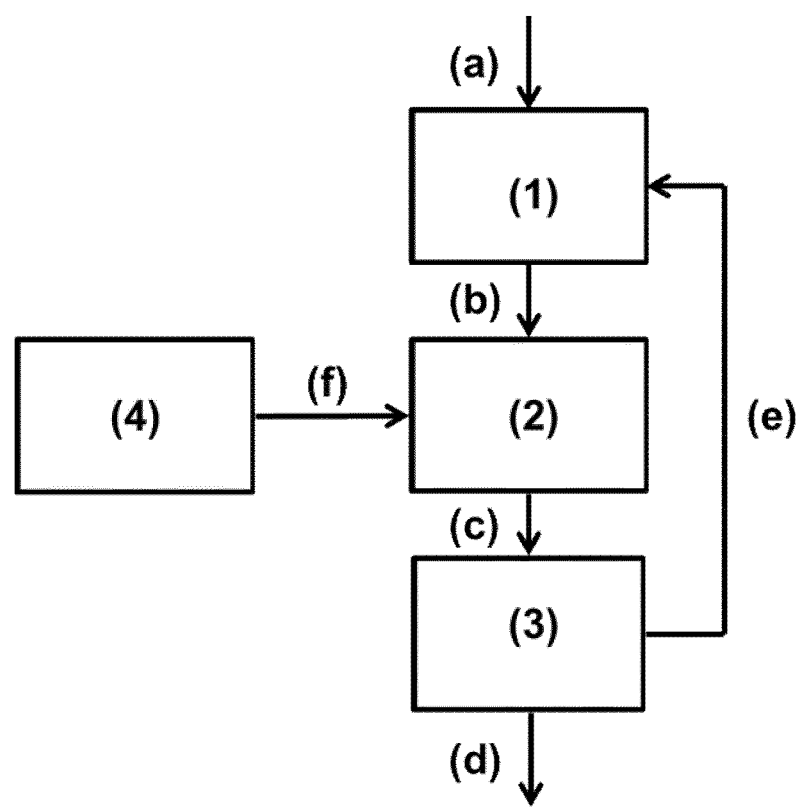

FIG. 2 depicts a process according to the present invention. Lines (a) to (e), and units (1) to (3) are as defined for FIG. 1. During the start-up operation, a suspension of ammonium sulfate crystals is fed from seed crystal preparation unit (4) through line (f) to crystallizer (2).

Figure 3:
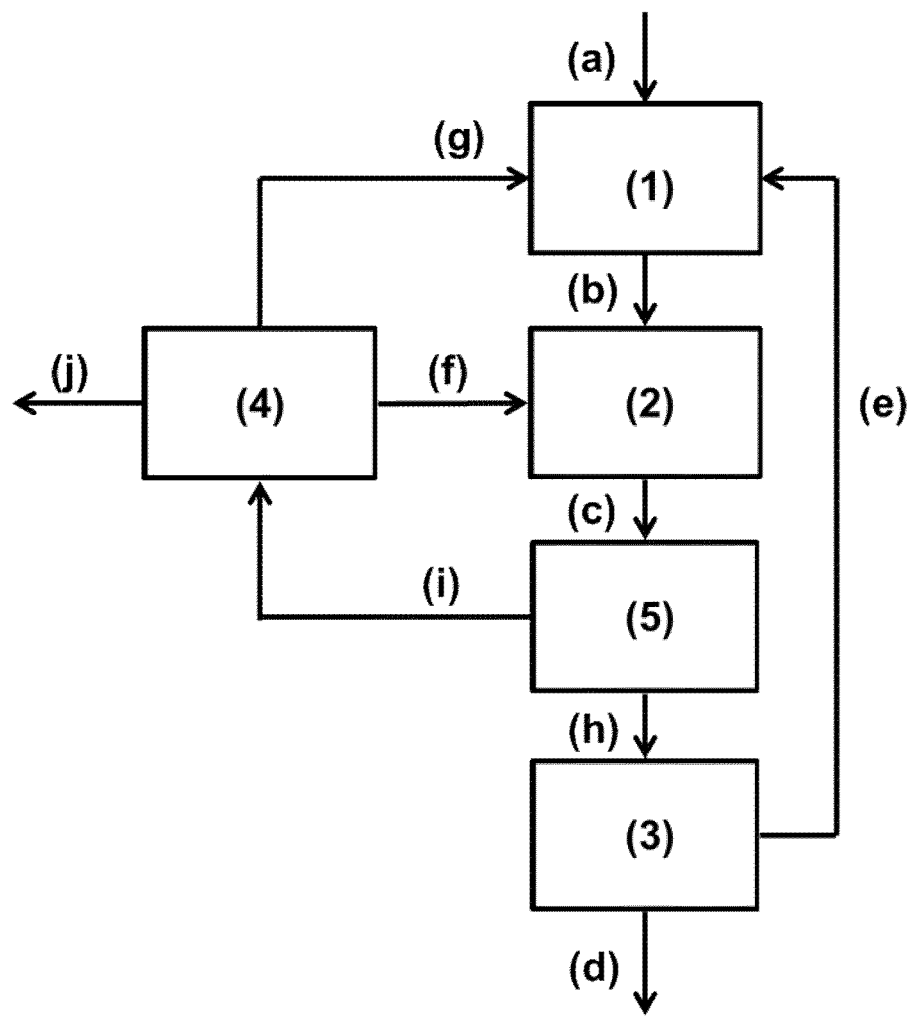

FIG. 3 depicts a process according to the present invention. Lines (a) to (e), and units (1) to (3) are as defined for FIG. 1. During the start-up operation, a suspension of ammonium sulfate crystals is fed from seed crystal preparation unit (4) through line (f) to crystallizer (2). The suspension of ammonium sulfate crystals passing through line (c) enter size classification unit (5), where a fine crystal fraction is separated and removed through line (i) to seed crystal preparation unit (4). The coarse crystal fraction is passed through line (h) to recovery unit (3). During steady-state operation, ammonium sulfate crystals are fed through line (g) into mixing unit (1). Any excess of seed crystals is passed through line (j) for further processing.

The present invention is illustrated by but not limited to the following examples.

EXAMPLES

Comparative Example 1

This comparative example was carried out in equipment corresponding substantially to that of FIG. 1.

A 300 $m^3$ Oslo-type fluid bed crystallizer (2) was used with an external circulation circuit for circulating slurry from the crystallizer body via a Begemann impeller pump, capacity 5000 $m^3 hr^{-1}$, and a heat exchanger. During start-up 180 $m^3$ of aqueous ammonium sulfate solution was present in the crystallizer. The crystallizer was operated by evaporation at a temperature of 90° C. Due to the evaporation of water and the feeding of the system with an approximately saturated ammonium sulfate solution originating from a plant producing caprolactam, the concentration of dissolved ammonium sulfate increased to such a level that spontaneous formation of ammonium sulfate crystals took place resulting in an ammonium sulfate slurry of mainly fine crystals (average diameter 0.4 mm).

The normal operation point of such a crystallizer uses an ammonium sulfate slurry with a density of 1400 $kgm^{-3}$ with crystals having an average crystal size of 2.4 mm. Therefore, time was required in this start-up phase to let the crystals grow to a size of 2.4 mm. This took approximately 40 hours before the steady-state operation point was reached.

The product of such a crystallization unit for ammonium sulfate was split into a high value product, comprising material with a particle size above 1.4 mm and a low value product, comprising material with a particle size below 1.4 mm.

Results are shown in Table 1, below.

Comparative Example 2

The performance of the above system was translated into a model which described the system using a combined mass, heat and population balance using the Borland Delphi 5.0 programming language. The population balance describing the crystal size distribution in the system was implemented according to a first order discretization scheme similar to the description given by M. J. Hounslow, R. L. Ryall, V. R. Marshall; *A discretized population balance for nucleation, growth, and aggregation*; AIChE J., 34 (1988) pp1821-1832. The description of primary crystal nucleation and crystal growth were obtained from lab scale experiments with reference to Jiang and ter Horst in Crystal Growth & Design (2011), Vol. 11, 256-261. The description of secondary crystal nucleation was calibrated on the basis of production data from an operating ammonium sulfate crystallizer. The model was used to simulate the performance of the described crystallizer system, consisting of a start-up period of approximately 30 hours and a steady-state production period of 90 hours. The performance of the crystallizer was characterized by the amount of material produced during the start-up and steady-state period that contains particles retained by a sieve of 1.4 mm as compared to the total amount of produced material in that period.

The simulation model was used to predict the scale-up of Comparative Example 1 by increasing the feed rate of the system by 40%. The volume of the crystallizer was 65% larger. This was calculated by keeping the velocity of the fluidized bed constant, and the ratio of dimensions of the crystallizer constant.

Results are shown in Table 1, below.

Example 1

This example was carried out in equipment corresponding substantially to that of FIG. 2.

In the embodiment according to the invention the simulation model developed for the Comparative Example was adapted for the equipment configuration as depicted in FIG. 2, by installing a seed crystal preparation unit (4) next to the crystallizer (2). The seed crystal preparation unit (4) is used to feed the crystallizer (2) during the start-up with 50 m³ of 40 wt-% slurry of ammonium sulfate containing ammonium sulfate crystals with an average crystal size of 0.87 mm and a relative standard deviation of 0.38. The slurry of seed crystals was fed just before the spontaneous formation of ammonium sulfate crystals would have taken place (calculated by supersaturation) and added within a time period of one hour at 90° C. The ammonium sulfate feed solution (a) is replaced by water during the feeding of the slurry. In order to accommodate the addition of the slurry, the volume of ammonium sulfate solution in the crystallizer is reduced before the start of the slurry feed.

Results are shown in Table 1.

TABLE 1

| Product after 120 hours operation | Comp. Ex. 1 [tons] | Comp. Ex. 2 [tons] | Example 1 [tons] |
|---|---|---|---|
| <1.4 mm steady- state operation | 330 | 279 | 279 |
| >1.4 mm steady-state operation | 1163 | 1794 | 1794 |
| <1.4 mm including start-up | 428 | 607 | 289 |
| >1.4 mm including start-up | 963 | 1366 | 1711 |

Table 1 gives the results of the Comparative Examples 1 and 2 and the Example 1.

Regarding Comparative Example 1, it can be seen that each start-up operation results in a decrease in product having size >1.4 mm of 200 tons; an increase in product having size <1.4 mm of 98 tons; and therefore a net reduction of 102 tons of product; compared with steady-state operation.

Comparative Example 2 shows for each start-up operation, a decrease in product having size >1.4 mm of 428 tons; an increase in product having size <1.4 mm of 328 tons; and therefore a net reduction of 100 tons of product; compared with steady-state operation.

Example 1 shows for each start-up operation, a decrease in product having size >1.4 mm of only 83 tons; an increase in product having size <1.4 mm of 10 tons; and therefore a net reduction of only 73 tons of product; compared with steady-state operation.

Comparative Example 2 and Example 1 are each for a system of the same flow rate. By using the process of Example 1 instead of the process of Comparative Example 2, an increase of 27 tons of total product for each start-up operation is observed. Further, and more importantly, this also leads to an increase of 345 tons of product having size >1.4 mm. This product having size >1.4 mm is more valuable than the smaller product.

Because the start-up operation of Example 1 is quicker than that of Comparative Example 2, the crystallization process as a whole (for a period of 120 hours, when start-up is considered) has a higher production capacity and increased throughput. Further, because a much smaller proportion of product crystals have size <1.4 mm, they do not need to be reprocessed to produce larger crystals, thereby saving energy. Accordingly, Example 1 demonstrates a great improvement over the known process.

The invention claimed is:

1. A continuous process for producing crystalline ammonium sulfate, wherein the process comprises a start-up operation followed by a steady-state operation, and wherein the start-up operation comprises:
   i) in a crystallizer, evaporating solvent from an approximately saturated ammonium sulfate solution;
   ii) replacing evaporated solvent with further approximately saturated ammonium sulfate solution;
   iii) introducing seed crystals of ammonium sulfate to the crystallizer;
   iv) continuing to evaporate solvent, until a desired degree of supersaturation is reached; and
   v) recovering crystalline ammonium sulfate from ammonium sulfate solution in a recovery unit, and wherein the steady-state operation comprises:
   vi) continuously feeding approximately saturated ammonium sulfate solution into the crystallizer and continuously withdrawing ammonium sulfate crystals from the crystallizer, such that the total combined volume of ammonium sulfate solution and ammonium sulfate crystals within the crystallizer remains constant; and
   vii) recovering crystalline ammonium sulfate from ammonium sulfate solution in a recovery unit, wherein the degree of supersaturation in the crystallizer during the start-up operation is maintained between 1.2% and the point at which primary nucleation occurs, and wherein the seed crystals of ammonium sulfate are introduced to the crystallizer only during the start-up operation and not during the steady state operation of the crystallizer.

2. A process according to claim 1, wherein the supersaturation in the crystallizer during the start-up operation is maintained between 1.2% and 2.5%.

3. A process according to claim 1, wherein the supersaturation in the crystallizer during the start-up operation is maintained between 1.3% and 2.2%.

4. A process according to claim 1, wherein the average size of seed crystals is below the average size of crystalline ammonium sulfate.

5. A process according to claim 4, wherein the average size of seed crystals fed to the crystallizer is below 1.4 mm.

6. A process according to claim 5, wherein the average size of seed crystals fed to the crystallizer is from 0.8 to 1.2 mm.

7. A process according to claim 1, wherein the seed crystals of ammonium sulfate have an average crystal surface area of from 3 to 4 $m^2$ $kg^{-1}$.

8. A process according to claim 1, wherein in step iii) the seed crystals of ammonium sulfate are fed for a time period of up to 6 hours.

9. A process according to claim 1, wherein step iii) is practiced by introducing a mixture of the seed crystals of ammonium sulfate with the solution of ammonium sulfate in a form of a slurry having a density at the start of step iii) which is from 1240 to 1260 $kgm^{-3}$.

10. A process according to claim 1, wherein the average size of crystals leaving the crystallizer is at least 1.4 mm.

11. A process according to claim 1, which further comprises a crystal size classification step, wherein a fine crystal fraction and a coarse crystal fraction are produced.

12. A process according to claim 11, wherein at least a portion of the fine crystal fraction is fed from the size classification step to step iii).

13. A process according to claim 1, wherein the temperature in the crystallizer is above 40° C.

* * * * *